United States Patent
Oh

(10) Patent No.: US 7,683,294 B2
(45) Date of Patent: Mar. 23, 2010

(54) MULTISTAGE CONTROL SYSTEM OF POSITIVE TEMPERATURE COEFFICIENT HEATER AND METHOD THEREOF

(75) Inventor: Man-Ju Oh, Ulsan (KR)

(73) Assignee: Hyundai Motor Company, Seoul (KR)

( * ) Notice: Subject to any disclaimer, the term of this patent is extended or adjusted under 35 U.S.C. 154(b) by 725 days.

(21) Appl. No.: 11/297,833

(22) Filed: Dec. 7, 2005

(65) Prior Publication Data

US 2007/0119847 A1 May 31, 2007

(30) Foreign Application Priority Data

Nov. 25, 2005 (KR) .................. 10-2005-0113752

(51) Int. Cl.
*H05B 1/02* (2006.01)
*B60L 1/02* (2006.01)

(52) U.S. Cl. .................. 219/505; 219/202; 219/208; 219/209; 219/506; 219/488; 219/489; 219/490; 219/492; 219/511; 219/519; 219/520; 219/521

(58) Field of Classification Search ............... 219/202, 219/205, 208–9, 505–6, 488–90, 492, 511, 219/519–521

See application file for complete search history.

(56) References Cited

U.S. PATENT DOCUMENTS 5,070,229 A * 12/1991 Takatsuka et al. ........... 219/203
6,078,024 A *  6/2000 Inoue et al. .................. 219/202

FOREIGN PATENT DOCUMENTS

JP    07-195931    8/1995
JP    2000-006649    1/2000

* cited by examiner

*Primary Examiner*—Shawntina Fuqua
(74) *Attorney, Agent, or Firm*—Edwards Angell Palmer & Dodge LLP; Kongsik Kim

(57) ABSTRACT

A multistage control system of a Positive Temperature Coefficient (PTC) heater for a vehicle is disclosed with a PTC heater that contains heating elements relevant to a first, second, and third stages. An Electronic Control Unit (ECU) outputs a control signal to a first relay, which switches the first stage into an ON and OFF state, for controlling the operation of the first stage of the PTC heater. A heater controller outputs control signals to a second relay and third relay, respectively, for controlling the operation of the second and third stages of the PTC heater, only if the first stage of the PTC heater is in activation via the ECU, wherein the second relay and the third relay each switch the second and third stages into an ON and OFF state.

15 Claims, 3 Drawing Sheets

MULTISTAGE CONTROL SYSTEM OF POSITIVE TEMPERATURE COEFFICIENT HEATER AND METHOD THEREOF

CROSS-REFERENCE TO RELATED APPLICATIONS

The present application is based on, and claims priority from, Korean Application Serial Number 10-2005-0113752, filed on Nov. 25, 2005, the disclosure of which is hereby incorporated by reference herein in its entirety.

FIELD OF THE INVENTION

The present invention relates to a multistage control system of a vehicular Positive Temperature Coefficient (PTC) heater and a method thereof adapted to activate the first stage of the PTC heater (an auxiliary heater of the vehicle) via an Electronic Control Unit (ECU) signal and to activate the second and third stages via signals of relevant controllers.

BACKGROUND OF THE INVENTION

As is well known, the Positive Temperature Coefficient (PTC) heater is an auxiliary air-heating device. The PTC heater generally has three heat-settings, each is activated by relevant relays. However, the heater is activated, only when the blower operates, from the first step and consecutively to the second and third steps according to the voltage state of the battery.

If the PTC heater operates while the blower is in deactivation, the windless inside of the heater may be overheated, causing a potential fire.

The conventional PTC heater, therefore, should be operated only after the activation of the blower.

Furthermore, the PTC heater takes at least 20 seconds to be heated up after the operation of the blower so that when the user initially activates the heater system, cold air blows into the passenger compartment. If the user turns off the blower in order to prevent the cold air, the PTC heater is also deactivated.

As a result, the quick air-heating type PTC heater is deteriorated in practical use due to the discharge of cold air in the event of its initial operation.

SUMMARY OF THE INVENTION

Embodiments of the present invention help activate the first stage of the Positive Temperature Coefficient (PTC) heater via the signal of the Electronic Control Unit (ECU) and activate the second and third stages via signals of relevant controllers, thus automatically preheating the inside of the heater while the first stage operates regardless of the activation of the blower.

A multistage control system of a PTC heater for a vehicle according to one embodiment of the present invention includes a PTC heater that contains heating elements relevant to a first, second, and third stages. An ECU outputs a control signal to a first relay, which switches the first stage into an ON and OFF state, for controlling the operation of the first stage of the PTC heater. A heater controller outputs control signals to a second relay and third relay, respectively, for controlling the operation of the second and third stages of the PTC heater, only if the first stage of the PTC heater is in activation via the ECU. The second relay turns the second stage ON and OFF, and the third relay turns the third stage ON and OFF.

A multistage control method of a PTC heater for a vehicle having the above system includes the steps of: after an engine is initially started, determining whether a driving condition for the first stage of the PTC heater is satisfied; if the driving condition for the first stage of the PTC heater is satisfied, activating the first stage of the PTC heater in accordance with a control signal of an ECU; performing a Time-Delay after the activation of the first stage of the PTC heater; after the Time-Delay, if the first stage of the PTC heater is detected to be in operation, activating a second stage of the PTC heater; performing a Time-Delay after the activation of the second stage of the PTC heater; after the Time-Delay, if the first stage of the PTC heater is detected to be in operation, determining whether a present battery voltage is greater than or equal to a first reference value; if the present battery voltage is greater than or equal to the first reference value, activating a third stage of the PTC heater; after the activation of the third stage of the PTC heater, determining whether a present battery voltage is less than or equal to a second reference value; and if the present battery voltage is less than or equal to the second reference value, deactivating the third stage of the PTC heater and returning to the step of activating the second stage of the PTC heater and then performing the Time-Delay.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
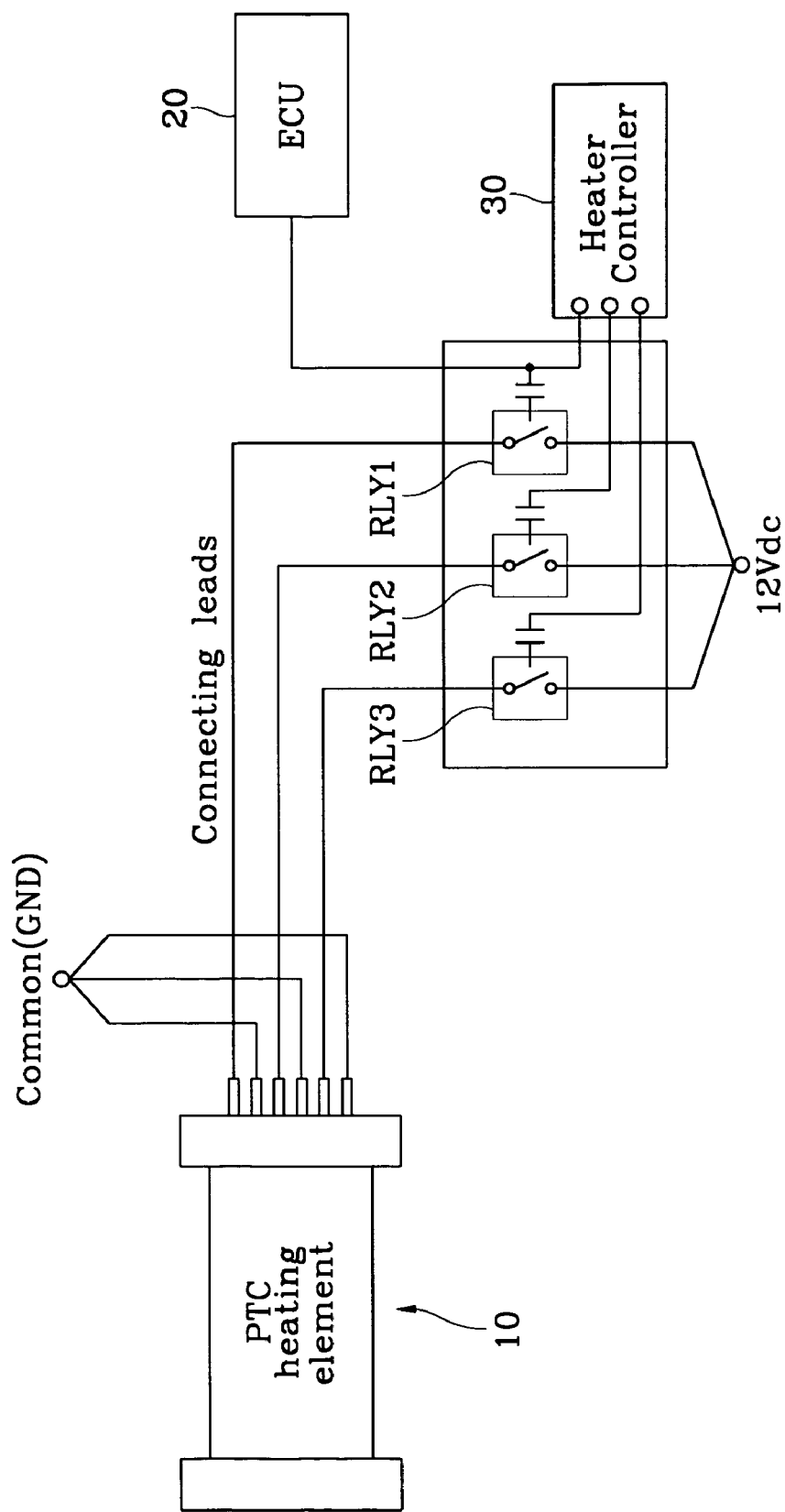
FIG. 1 is a schematic block diagram for a multistage control system of a Positive Temperature Coefficient (PTC) heater according to an embodiment of the present invention.

With reference to FIG. 1, a multistage control system of a Positive Temperature Coefficient (PTC) heater for a vehicle according to one embodiment of the present invention includes a PTC heater 10 that contains heating elements relevant to a first, second, and third stages. An Electronic Control Unit (ECU) 20 outputs a control signal to a first relay (RLY1), which switches the first stage of PTC heater 10 into an ON and OFF state, for controlling the operation of the first stage. A heater controller 30 outputs control signals to a second relay (RLY2) and third relay (RLY3), respectively, for controlling the operation of the second and third stages of PTC heater 10, only if the first stage of PTC heater 10 is in activation via ECU 20. The second relay (RLY2) and third relay (RLY3) each switch the second and third stages into an ON and OFF state.

In order to drive the first, second and third stages of PTC heater 10, a 12V is supplied to each relay (RLY1-RLY3).

Figure 2:
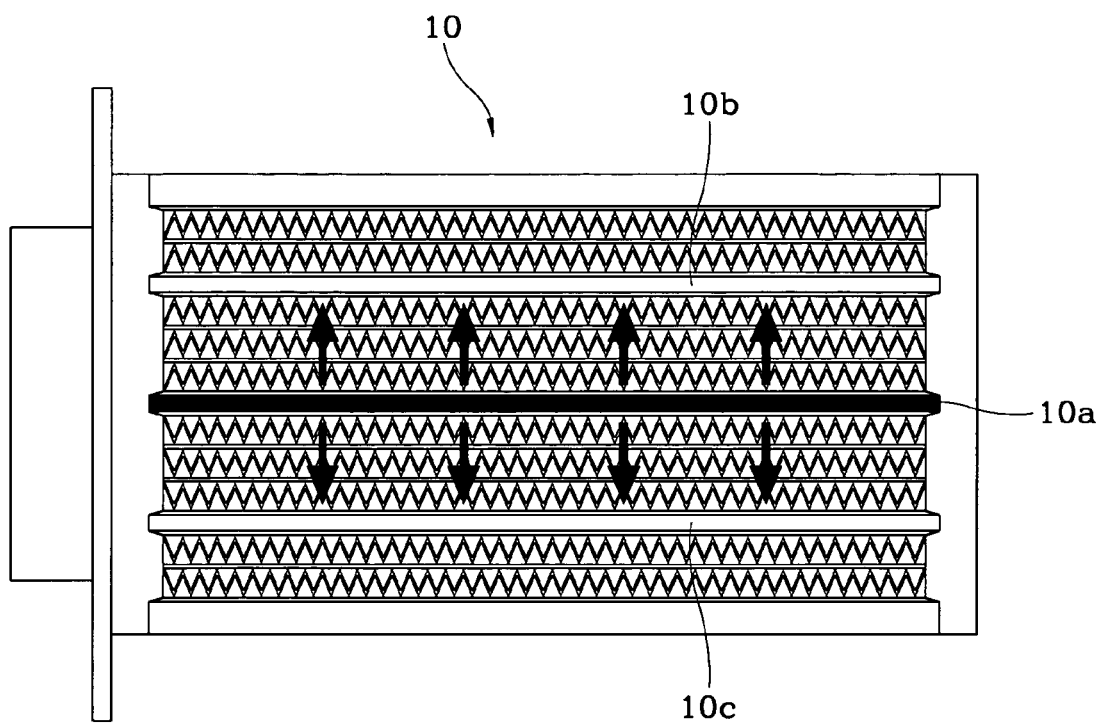
FIG. 2 is a constitutional view for actuators of each stage of a PTC heater according to an embodiment of the present invention.

In reference to FIG. 2, a first stage PTC actuator 10a is disposed at the core of PTC heater 10. A second stage PTC actuator 10b and third stage PTC actuator 10c are, respectively, situated at both sides of the first stage PTC actuator 10a, thus preventing the overheating of the heater. By way of reference, the arrows in FIG. 2 denote the moving route of the heat within the heater.

Figure 3:
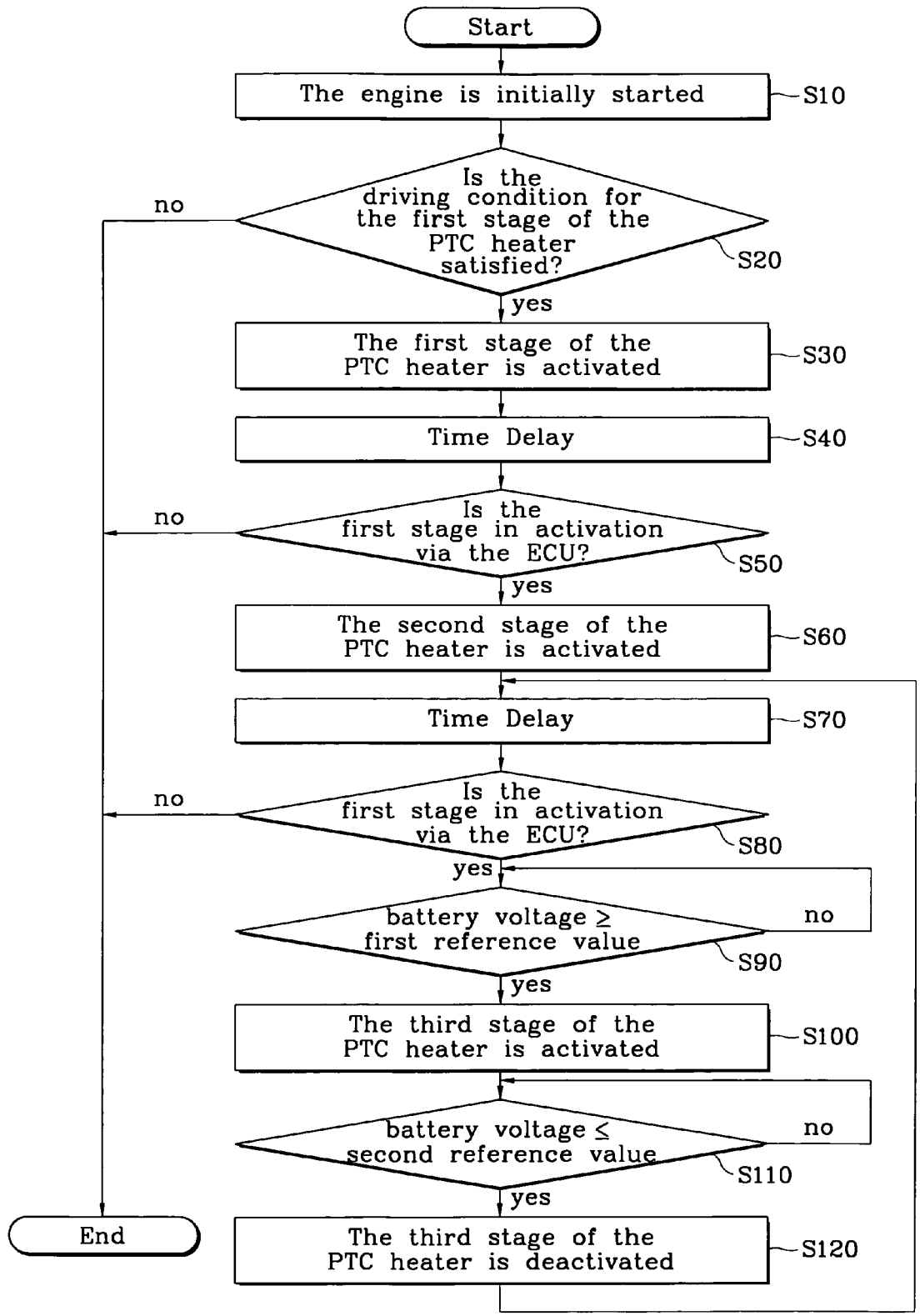
FIG. 3 is a flowchart for a multistage control method of a PTC heater according to an embodiment of the present invention.

A multistage control method of a PTC heater for a vehicle thus constructed will now be described with reference to FIG. 3.

When the engine is initially started, the ECU determines whether a driving condition for the first stage of PTC heater 10 is satisfied (step 10, step 20). The driving condition for the first stage of the PTC heater represents that the outside temperature is 15° C. or less, the engine RPM is 600 or greater, and the coolant temperature is 80° C. or lower.

If the driving condition for the first stage of the PTC heater is satisfied in step 20, the first stage of the PTC heater starts to operate in accordance with a control signal of the ECU and a Time-Delay is executed for a predetermined period of time (step 30, step 40). The Time-Delay is preferably set for approximately 15 seconds; however, the value of time can variously be set by the user.

After activating the first stage and performing the Time-Delay in steps 30 and 40, if the first stage of the PTC heater is detected to be in operation corresponding to the control signal of the ECU, the second stage of the PTC heater is driven by a control signal of the heater controller and a prescribed Time-Delay is carried out (step 50-step 70).

After activating the second stage and performing the Time-Delay in steps 60 and 70, if the first stage of the PTC heater is still in activation according to the control signal of the ECU, then the present voltage state of the battery is detected for deciding whether the third stage of the PTC heater will be activated (step 80).

In case the first stage of the PTC heater is in activation in step 80 even after the second stage of the PTC heater is driven, and if the present battery voltage is greater than or equal to a first reference value, the third stage of the PTC heater operates in response to a control signal of the heater controller. Next, if the present battery voltage is decreased to a second reference value or even lower, the third stage of the PTC heater is deactivated (step 90-step 120).

After deactivation of the third stage of the PTC heater in step 120, the driving control returns to step 70 for the Time-Delay for re-determining whether the third stage of the PTC heater will be operated.

As of the first reference value in step 90 and the second reference value in step 110, the first reference value is set to be 12V if the third stage of the PTC heater is in initial operation and set to be 13.2V if the third stage of the PTC heater is in re-operation. The reference voltage is differently set in above cases for preventing the overload of the battery and improving the life thereof. The second reference value is established to be 11.5V.

The Time-Delay (about 15 seconds or lower) after the operation of each stage of the PTC heater also prevents vehicle lights from dimming down.

Provided that the driving condition for the first stage of the PTC heater is not satisfied in step 20, or the first stage of the PTC heater is in the OFF state in step 50 after activating the first stage of the PTC heater and performing the Time-Delay, or the first stage of the PTC heater is in the OFF state in step 80 after activating the second stage of the PTC heater and performing the Time-Delay, then the control logic of the PTC heater is finished.

In the present embodiment, the first stage of the PTC heater operates according to the control signal of the ECU regardless of the activation of the blower and preheats the inside of the heater. This prevents cold air from the PTC heater during the initial operation of the blower.

Further, as shown in FIG. 2, only the first stage of the PTC heater located at the heater core operates during the preheating, thus preventing the overheating of the heater.

The PTC actuators for the second and third stages are situated at both sides of the first stage PTC actuator, respectively, contributing to a prevention of the deformation of the heater case.

The technical concept of the present invention is not limited to the above embodiment but should be determined by a logical interpretation on the basis of the claims of the present invention.

As apparent from the foregoing, there is an advantage in that the preheating function of the PTC heater prevents the discharge of cold air during the operation of the blower.

Also, as the first stage PTC actuator is positioned at the heater core, the overheating is avoided during the preheating.

Moreover, the PTC heater thus constructed may be applied in any types of vehicles as an auxiliary heater without a modification of the logic of the ECU and heater controller of the vehicle.

What is claimed is:

1. A multistage control system of a Positive Temperature Coefficient heater for a vehicle, comprising:
   (i) a Positive Temperature Coefficient heater that contains heating elements relevant to a first, second, and third stages;
   (ii) an Electronic Control Unit that is an engine control unit determining whether a driving condition for the first stage of the Positive Temperature Coefficient heater is satisfied with data comprising an engine RPM and a coolant temperature,
   the Electronic Control Unit outputting a control signal to a first relay, which switches the first stage into an ON and OFF state, for controlling an operation of the first stage of said Positive Temperature Coefficient heater; and
   (iii) a heater controller that outputs control signals to a second relay and third relay, respectively, for controlling an operation of the second and third stages of said Positive Temperature Coefficient heater, only if the first stage of said Positive Temperature Coefficient heater is in activation via said ECU, wherein said second relay and third relay each switch the second and third stages into an ON and OFF state.

2. The system as defined in claim 1, wherein a first stage Positive Temperature Coefficient actuator is disposed at a core of said Positive Temperature Coefficient heater, and a second stage Positive Temperature Coefficient actuator and a third stage Positive Temperature Coefficient actuator are, respectively, situated at both sides of said first stage Positive Temperature Coefficient actuator.

3. The system as defined in claim 1, wherein a 12V is supplied to each relay to drive each stage of said Positive Temperature Coefficient heater.

4. A multistage control method of a Positive Temperature Coefficient heater for a vehicle, comprising the steps of:
   after an engine is initially started, determining whether a driving condition for a first stage of said Positive Temperature Coefficient heater is satisfied;
   if the driving condition for the first stage of said Positive Temperature Coefficient heater is satisfied, activating the first stage of said Positive Temperature Coefficient heater in accordance with a control signal of an Electronic Control Unit;
   performing a Time-Delay after the activation of the first stage of said Positive Temperature Coefficient heater;
   after the Time-Delay, if the first stage of said Positive Temperature Coefficient heater is detected to be in activation, activating a second stage of said Positive Temperature Coefficient heater;

performing a Time-Delay after the activation of the second stage of said Positive Temperature Coefficient heater;

after the Time-Delay, if the first stage of said Positive Temperature Coefficient heater is detected to be in activation, determining whether a present battery voltage is greater than or equal to a first reference value;

if the present battery voltage is greater than or equal to the first reference value, activating a third stage of said Positive Temperature Coefficient heater;

after the activation of the third stage of said Positive Temperature Coefficient heater, determining whether a present battery voltage is less than or equal to a second reference value; and if the present battery voltage is less than or equal to the second reference value, deactivating the third stage of said Positive Temperature Coefficient heater and returning to the step of activating the second stage of said Positive Temperature Coefficient heater and then performing the Time-Delay.

5. The method as defined in claim 4, wherein the driving condition for the first stage of said Positive Temperature Coefficient heater represents that an outside temperature is 15° C. or less, an engine RPM is 600 or greater, and a coolant temperature is 80° C. or lower.

6. The method as defined in claim 4, wherein the Time-Delay after an operation of each stage of said Positive Temperature Control heater is 15 seconds or lower.

7. The method as defined in claim 4, wherein the first reference value is set to be 12V if the third stage of said Positive Temperature Coefficient heater is in initial operation and set to be 13.2V if the third stage of said Positive Temperature Coefficient heater is in re-operation.

8. The method as defined in claim 4, wherein the second reference value Is set to be 11.5V.

9. The method as defined in claim 4, further comprising a step of: in case the driving condition for the first stage of said Positive Temperature Coefficient heater is not satisfied, or the first stage of said Positive Temperature Coefficient heater is in the OFF state after activating the first stage of said Positive Temperature Coefficient heater and performing the Time-Delay, or the first stage of said Positive Temperature Coefficient heater is in the OFF state after activating the second stage of said Positive Temperature Coefficient heater and performing the Time-Delay, then finishing a control logic of said Positive Temperature Coefficient heater.

10. A multistage control system of a Positive Temperature Coefficient heater for a vehicle, comprising:
(i) a Positive Temperature Coefficient heater that contains heating elements relevant to at least first, second, and third stages;
(ii) an Electronic Control Unit that is an engine control unit determining whether a driving condition for the first stage of the Positive Temperature Coefficient, the Electronic Control Unit outputting a control signal to a first relay, which switches the first stage into an ON and OFF state, for controlling an operation of the first stage of said Positive Temperature Coefficient heater; and
(iii) a heater controller that outputs control signals to a second relay and third relay, respectively, for controlling an operation of the second and third stages of said Positive Temperature Coefficient heater.

11. The system of claim 1 wherein a heater controller that outputs control signals only if the first stage of said Positive Temperature Coefficient heater is in activation via said ECU, wherein said second relay and third relay each switch the second and third stages into an ON and OFF state.

12. A multistage control method of a Positive Temperature Coefficient heater for a vehicle, comprising:
after an engine is started, determining whether a driving condition for a first stage of said Positive Temperature Coefficient heater is satisfied;

if the driving condition for the first stage of said Positive Temperature Coefficient heater is satisfied, activating the first stage of said Positive Temperature Coefficient heater;

performing a Time-Delay after the activation of the first stage of said Positive Temperature Coefficient heater;

after the Time-Delay, if the first stage of said Positive Temperature Coefficient heater is detected to be in activation, activating a second stage of said Positive Temperature Coefficient heater;

performing a Time-Delay after the activation of the second stage of said Positive Temperature Coefficient heater;

after the Time-Delay, if the first stage of said Positive Temperature Coefficient heater is detected to be in activation, determining whether a present battery voltage is greater than or equal to a first reference value;

if the present battery voltage is greater than or equal to the first reference value, activating a third stage of said Positive Temperature Coefficient heater;

after the activation of the third stage of said Positive Temperature Coefficient heater, determining whether a present battery voltage is less than or equal to a second reference value.

13. The method of claim 12 further comprising, if the present battery voltage is less than or equal to the second reference value, deactivating the third stage of said Positive Temperature Coefficient heater and returning to the step of activating the second stage of said Positive Temperature Coefficient heater and then performing the Time-Delay.

14. A vehicle comprising a system of claim 1.

15. A vehicle comprising a system of claim 10.

* * * * *